(12) United States Patent
Ijima

(10) Patent No.: US 6,447,709 B1
(45) Date of Patent: Sep. 10, 2002

(54) PROCESS FOR PRODUCING RESINOUS HOSE

(75) Inventor: Toshiro Ijima, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/693,959

(22) Filed: Oct. 23, 2000

(30) Foreign Application Priority Data

Oct. 25, 1999 (JP) .......................................... 11-302500
Dec. 9, 1999 (JP) .......................................... 11-350550

(51) Int. Cl.$^7$ ............................................. B29C 59/00
(52) U.S. Cl. ...................................... 264/506; 264/508
(58) Field of Search ................................ 264/506, 508

(56) References Cited

U.S. PATENT DOCUMENTS 2,012,766 A * 8/1935 Meyer .......................... 153/73
5,435,962 A * 7/1995 Kramer, Jr. .................. 264/507
6,287,508 B1 * 9/2001 Stripe .......................... 264/570

FOREIGN PATENT DOCUMENTS

JP 7-71663 3/1995

* cited by examiner

Primary Examiner—Suzanne E. McDowell
(74) Attorney, Agent, or Firm—Arent Fox Kintner Plotkin & Kahn

(57) ABSTRACT

Bellows-shaped pleats are formed by a corrugator on bellows portions of a cylindrical hose formed by extrusion from a thermoplastic resin. The height of the pleats of the hose is uniform in a circumferential direction, and the numbers of the pleats on the bellows portions are different from one another. When water is encapsulated in the hose and the hose is heated, the pleats having different circumferential shapes from one another are stretched by the pressure of a vapor generated from the water, whereby the bellows portions of the hose are bent automatically with the portions corresponding to generating lines and free from the pleats being on an inner side. The bending angle at that time is determined depending on the numbers of the pleats. Thus, it is possible to provide a resinous hose at a low cost, which is formed, so that even if the hose is used in a high-temperature and a high-pressure environment, the bent shape of the hose can be maintained over a long period of time.

2 Claims, 6 Drawing Sheets

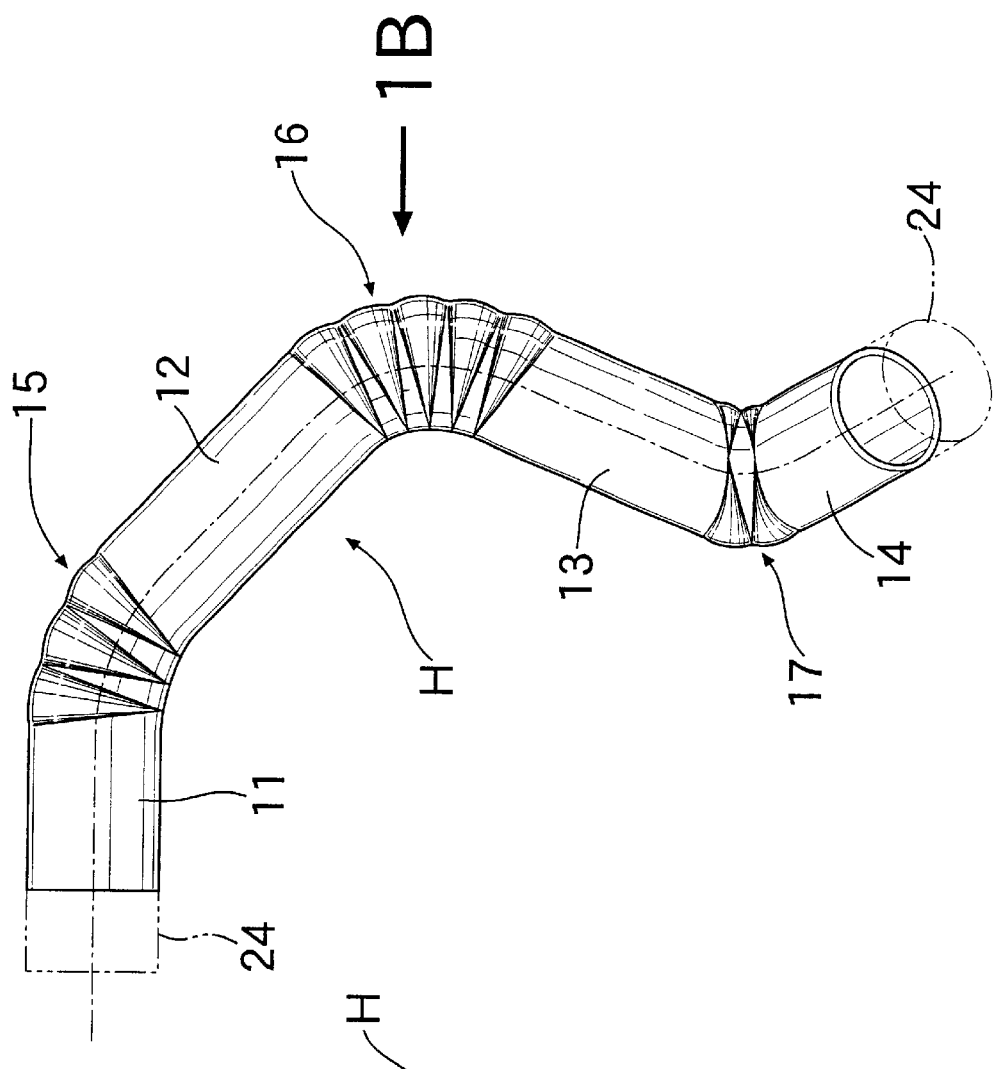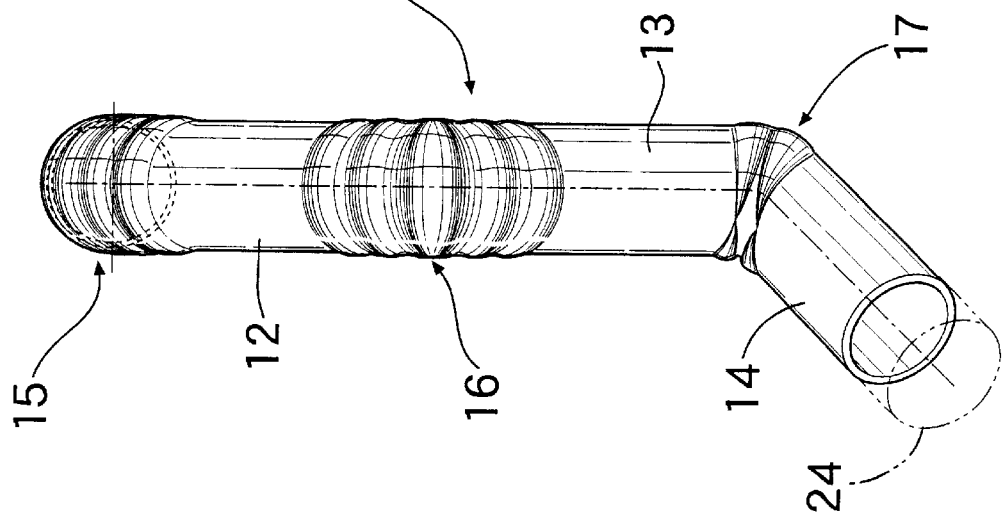

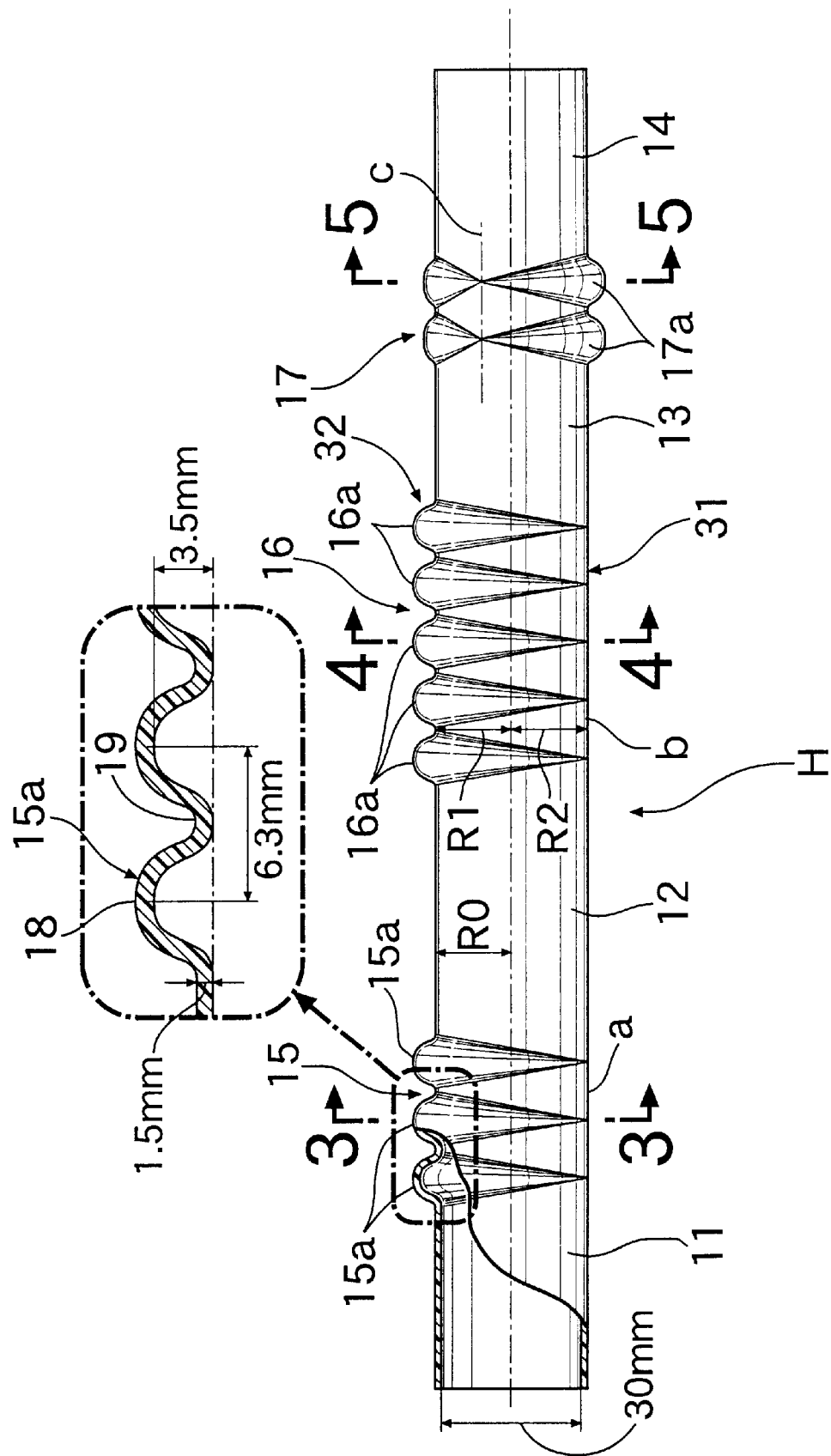

FIG.6C
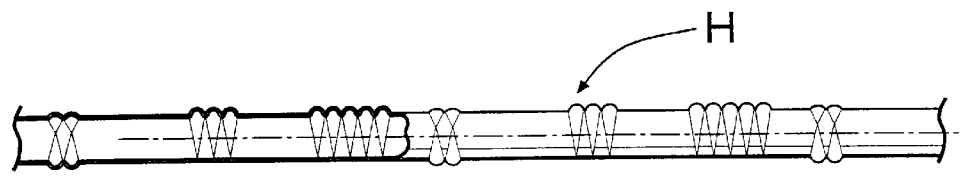
FIG.6D
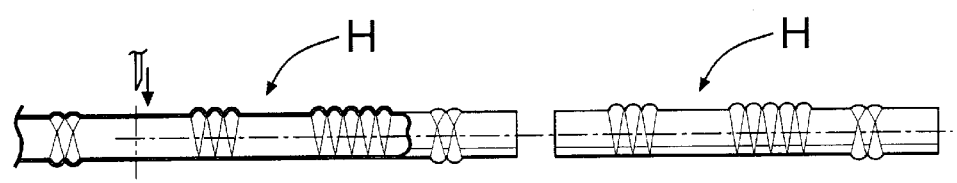
FIG.6E
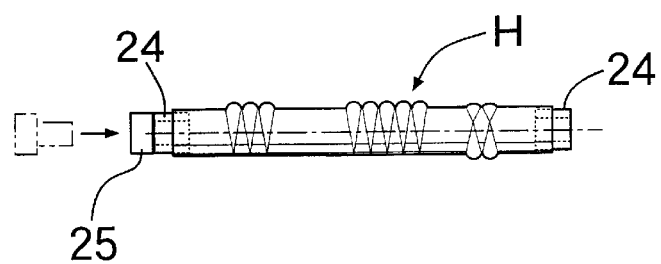
FIG.6G  FIG.6F
FIG.6H
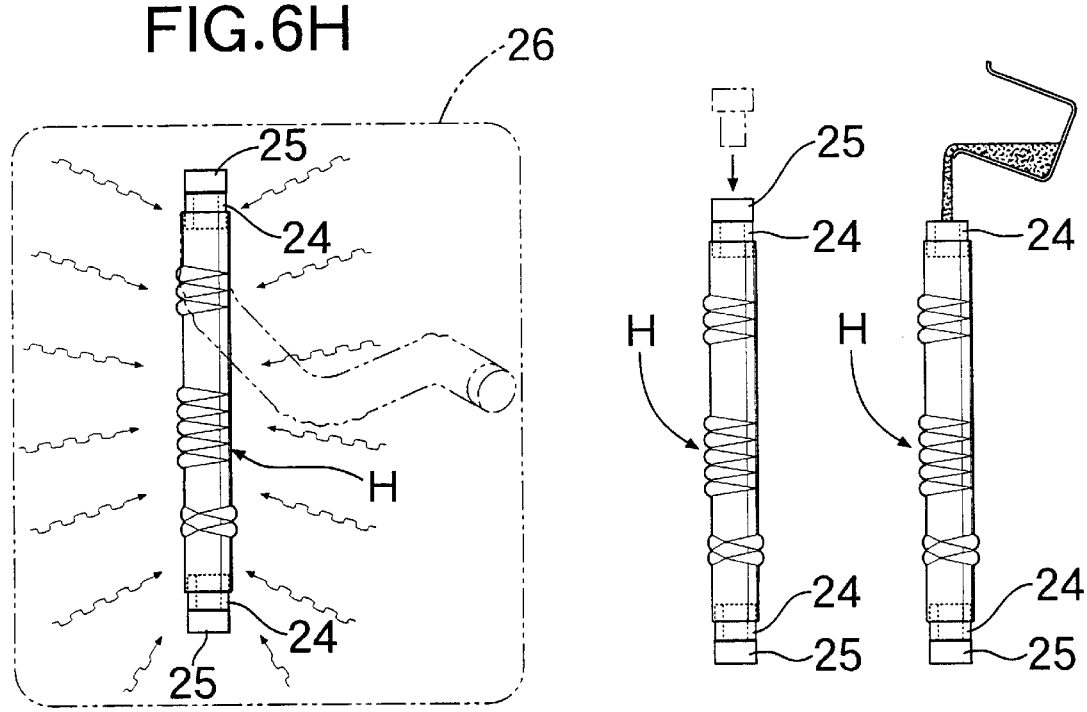

PROCESS FOR PRODUCING RESINOUS HOSE

BACKGROUND OF THE INVENTION

1. Field of the Invention

The present invention relates to a process for producing a resinous hose formed from a thermoplastic resin and having bent portions.

2. Description of the Related Art

A bendable rubber hose is conventionally used as a radiator hose for an automobile, which is required to be mounted to extend within a narrow engine room. Alternatively, various hoses made from a resin material that is lightweight as compared with the rubber have been proposed. For example, Japanese Patent Application Laid-open No. 7-71663 discloses a radiator hose used by bending a flexible resinous hose having a bellows-shaped unevenness formed thereon into a predetermined shape.

However, the conventional radiator hose described in Japanese Patent Application Laid-open No. 7-71663 suffers from the following problem: The resinous hose is arranged in the elastically bent state. For this reason, when the internal pressure of cooling water is applied to the resinous hose, the bent resinous hose is stretched to the original rectilinear shape and hence, the shape of the hose is not stable.

Therefore, it is conceived that a resinous hose having the bellows-shaped unevenness formed thereon is plastically deformed into the shape of use, so that the shape at the time of application of the internal pressure is stabilized. To plastically deform the resinous hose having the bellows-shaped unevenness formed thereon into a desired shape, a coil spring may be inserted into the heated resinous hose, or a pressure may be applied to the inside of the resinous hose, thereby applying an external force to the hose to bend the hose, while preventing the hose from being crushed. Then, the hose may be cooled and solidified and thereafter, the coil spring may be withdrawn, or the internal pressure may be removed. Another method is to insert a resinous hose having the bellows-shaped unevenness formed thereon into a die, and then heat the die to form the resinous hose having the desired shape.

However, a resinous hose bent by the above methods suffers from the following problem: The steps of producing such hoses are not only complicated and increase the cost, but also when the resinous hose is used in a high-temperature and a high-pressure environment, as is the case with the radiator hose, the pleats of the bellows are stretched by a creep phenomenon, whereby the bent shape is gradually varied.

SUMMARY OF THE INVENTION

Accordingly, it is an object of the present invention to provide a resinous hose at a low cost, wherein even if the hose is used in a high-temperature and high-pressure environment, the bent shape thereof can be maintained over a long period of time.

To achieve the above object, according to a first aspect and feature of the present invention, there is provided a process for producing a resinous hose formed from a thermoplastic resin having cylindrical portions extending rectilinearly, and a bent bellows portion, the process comprising a first step of forming a cylindrical hose by extrusion, a second step of forming a bellows portion which has pleats each shaped to be differentiated circumferentially, at least at a lengthwise portion of the extruded hose, a third step of heating the hose having the bellows portion formed thereon into a plastic state, and a fourth step of bending the hose by applying a pressure to an inside of the hose heated into the plastic state, thereby stretching the pleats of the bellows portion, and a fifth step of cooling the bent hose.

With the above process, the bellows portion which has pleats differentiated circumferentially in shape are formed at least at a lengthwise portion of the extruded hose, and the pressure is applied to the inside of the hose in the heated state to stretch the pleats of the bellows portion, thereby bending the hose. Therefore, any portions of the hose can be bent through any angles in any directions by only changing the positions of the bellows portion, the shapes and the numbers of the pleats and the like. In addition, the bellows portion can be bent only by heating and pressurizing the hose and hence, special equipment is not required, leading to a reduced manufacture cost. Moreover, the pleats of the bellows portion of the completed hose are almost stretched out, whereby the bellows structure is lost. Therefore, even if the hose is exposed to a high temperature and a high pressure, the bent angle of the bellows portion is not varied, and hence, the shape of the hose can be maintained over a long period of time.

According to a second aspect and feature of the present invention, in addition to the first feature, the bellows portion of the hose formed in the second step includes a bellows wall having continuous crests and valleys, and a non-bellows wall located on the side diametrically opposite to the bellows wall. Additionally, in the second step, a portion of the cylindrical hose formed in the first step is displaced radially inwards to form the valleys on the bellows wall, and a portion of the cylindrical hose is displaced radially outwards to form the non-bellows wall.

With the above feature, a portion of the cylindrical hose is displaced radially inwards to form the valleys of the bellows wall, and a portion of the cylindrical hose is displaced radially outwards to form the non-bellows wall in the second step. Therefore, the decrease in thickness of the bellows wall that may be thinned during the formation can be suppressed to the minimum, and the thickness of the non-bellows wall that may be thickened during the formation can be positively decreased, whereby the thickness of the bellows portion of the entire hose can be uniform over the entire region. Thus, durability can be enhanced without increasing the weight of the hose and without decreasing the sectional area of a flow path.

According to a third aspect and feature of the present invention, there is provided a resinous hose formed in the second step of a process for producing a resinous hose according to the first feature, wherein the bellows portion includes a bellows wall having continuous crests and valleys, and a non-bellows wall located on the side diametrically opposite to the bellows wall, the outside diameter of the valleys of the bellows wall being smaller than the outside diameter of the cylindrical portions, and the outside diameter of the non-bellows wall being larger than the outside diameter of the cylindrical portions.

With the above feature, the outside diameter of the valleys of the bellows wall is smaller than the outside diameter of the cylindrical portions, and the outside diameter of the non-bellows wall is larger than the outside diameter of the cylindrical portions. Therefore, the decrease in thickness of the bellows wall that may be thinned during the formation can be suppressed to the minimum, and the thickness of the non-bellows wall that may be thickened during the forma-tion can be positively decreased, whereby the thickness of the bellows portion of the hose can be uniform over the entire region. Thus, the durability can be enhanced without increasing the weight of the hose and without decreasing the sectional area of a flow path.

The above and other objects, features and advantages of the invention will become apparent from the following description of the preferred embodiments taken inconjunction with the accompanying drawings.

BRIEF DESCRIPTION OF THE DRAWINGS

FIGS. 1A to 7 show embodiments of the present invention, wherein

FIG. 1A is a side view of a completed resinous hose;

FIG. 1B is a view taken in the direction of an arrow 1B in FIG. 1A;

FIG. 2 is a side view of the resinous hose before being bent;

FIG. 3 is a sectional view taken along a line 3—3 in FIG. 2;

FIG. 4 is a sectional view taken along a line 4—4 in FIG. 2;

FIG. 5 is a sectional view taken along a line 5—5 in FIG. 2;

FIGS. 6A to 6H are views showing steps of producing the resinous hose; and

FIG. 7 is a longitudinal sectional view of a resinous hose before being bent according to a second embodiment of the present invention.

DESCRIPTION OF THE PREFERRED EMBODIMENTS

Figure 3:
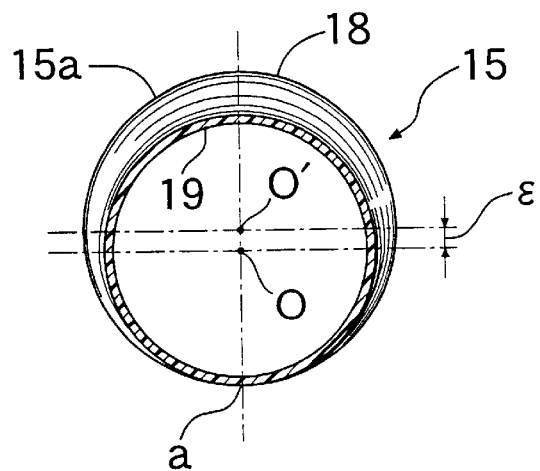
Figure 4:
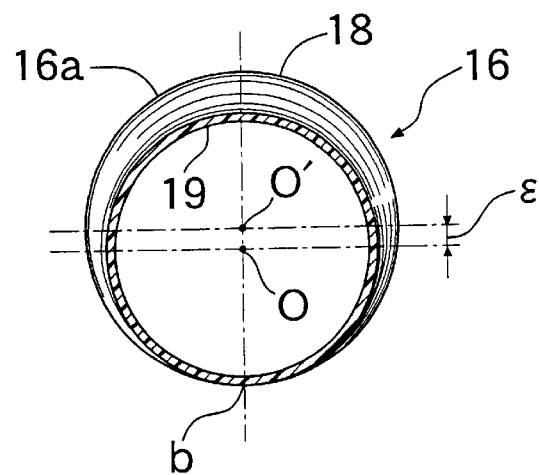
Figure 5:
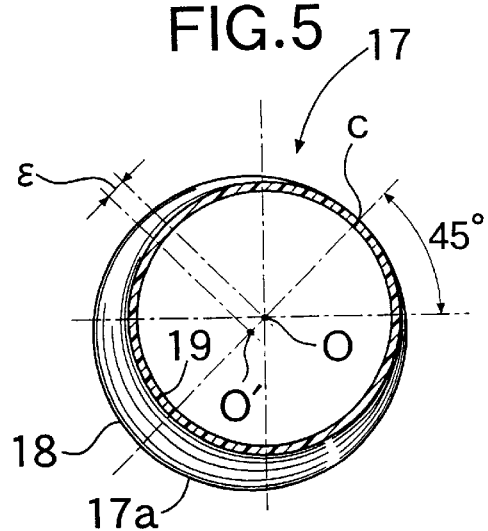

A first embodiment of the present invention will now be described with reference to FIGS. 1A to 6H.

As shown in FIGS. 1A and 1B, a hose H made of a thermoplastic resin and used as a radiator hose for an automobile includes first, second, third and fourth cylindrical portions 11, 12, 13 and 14 any of which is formed into a cylindrical shape, a first bellows portion 15 provided between the first and second cylindrical portions 11 and 12, a second bellows portion 16 provided between the second and third cylindrical portions 12 and 13, and a third bellows portion 17 provided between the third and fourth cylindrical portions 13 and 14. The first, second and third cylindrical portions 11, 12 and 13 are bent on the same plane at the first and second bellows portions 15 and 16, and the fourth cylindrical portion 14 is bent at the third bellows portion 17 so as to extend out from the plane.

FIGS. 2 to 5 show the shape of a hose H at a stage before bending of the first to third bellows portions 15 to 17. The first to third bellows portions 15 to 17 each of which is formed into the bellows-shape having three, five and two pleats 15a, 16a and 17a, respectively. Each of the pleats 15a, 16a and 17a includes a large-diameter crest 18 and a small-diameter valley 19. The small-diameter valley 19 has the same cross section as cross sections of the first to fourth cylindrical portions 11 to 14 and has a center O commonly with the first to fourth cylindrical portions 11 to 14. The large-diameter crest 18 has a center O' of its cross section, which is eccentric by ε to the center O of the cross section of the valley 19.

When the hose H is viewed axially, the pleats 15a, 16a and 17a of the first to third bellows portions 15 to 17 disappear on generating lines a, b and c parallel to the axis of the hose H, respectively. Each of these portions is a non-bellows wall 31 of the hose H. The unevenness of the corrugated shape of each of the pleats 15a, 16a and 17a is the largest at diametrically opposite portions of the hose H with respect to the generating lines a, b and c. Each of these portions is a bellows wall 32 of the hose H. Two of the generating lines a and b lie on the same straight line, but the other one generating line c lies at a location displaced through a circumferential angle of 45° from the two generating lines a and b.

In the present embodiment, the smallest thickness of the hose H is 1.0 mm, and the inside diameter of the valley 19 of the hose H (the inside diameters of the first to fourth cylindrical portions 11 to 14) is 30 mm. A difference between the diameters of the crest 18 and the valley 19 of the hose H is 3.5 mm, and the pitch between the adjacent pleats 15a, 16a, 17a is 6.3 mm.

Steps of producing the hose H will be described with reference to FIGS. 6A to 6H.

Figure 6A:
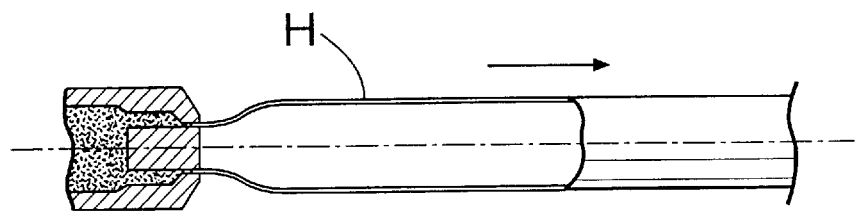

First, as shown in FIG. 6A, a cylindrical hose H as a blank is formed by an extrusion using a thermoplastic resin such as TPO (an olefinic thermoplastic elastomer) and PA (a polyamide) as a starting material.

Figure 6B:
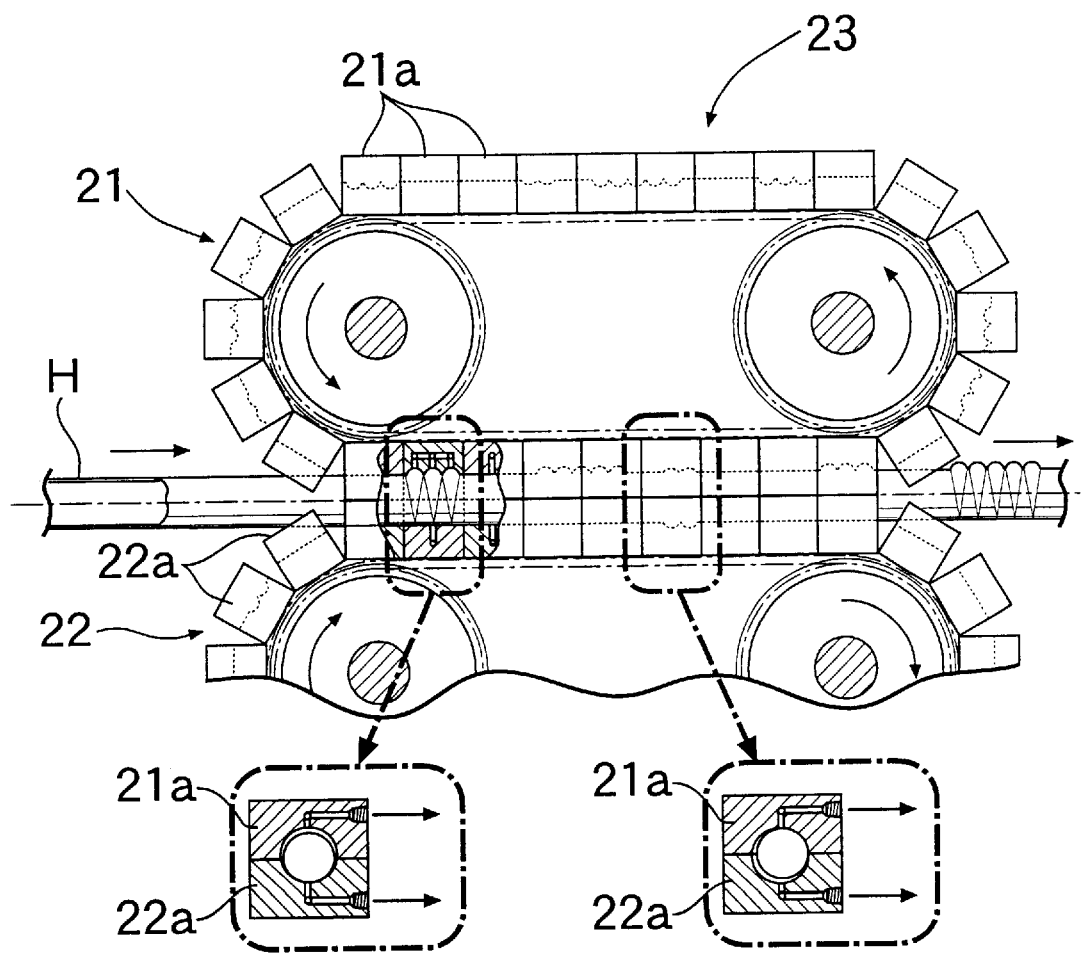

Then, as shown in FIG. 6B, pleats 15a, 16a and 17a of first to third bellows portions 15 to 17 are formed in the hose H by a corrugator 23 including a pair of die groups 21 and 22. Each of the die groups 21 and 22 is comprised of a large number of block-shaped dies 21a, 22a—connected together in an endless fashion. The dies 21a, 22a—of both the die groups 21 and 22 have molding surface portions for forming the pleats 15a, 16a and 17a on opposed surfaces. The hose H formed by the extrusion and having a high temperature is clamped between the dies 21a and 22a of the revolved die groups 21 and 22 and drawn by suction to become into close contact with the molding surface portions of the dies 21a and 22a, whereby the pleats 15a, 16a and 17a are formed to produce a continuous hose H having a shape as shown in FIG. 6C.

Subsequently, as shown in FIG. 6D, the continuous hose H is cut at a predetermined length having first to fourth cylindrical portions 11 to 14 and first to third bellows portions 15 to 17. As shown in FIG. 6E, female couplers 24, 24 are fixed to opposite ends of the cut hose H by adhering or welding, and a male coupler 25 as a blind plug is coupled to one of the female couplers 24. The female coupler 24 and the male coupler 25 are known and coupled together into a liquid-tight state by only pushing them to each other, and the coupling of these couplers is released by pushing a button (not shown) mounted on the female coupler 24.

Then, as shown in FIG. 6F, water containing 50% of a coolant incorporated therein is poured into the hose H through the other female coupler 24 (i.e., the coupler 24 to which the male coupler 25 is not coupled) such that the water occupies about two third of the internal volume of the hose H. Thereafter, as shown in FIG. 6G, the male coupler 25 as the blind plug is coupled to the other female coupler 24, thereby encapsulating the water in the hose H.

Subsequently, as shown in FIG. 6H, the hose H in which the water is encapsulated is placed into a thermostatic chamber 26 and heated at 120° C. for 2 hours. This causes the water in the hose H to be heated into vapor, thereby increasing the internal pressure in the hose H, for example, to $2 \times 10^5$ Pa. Therefore, the pleats 15a, 16a and 17a of the hose H brought into a plastic state under the influence of a high temperature are stretched out under the action of the internal pressure. At this time, the unevenness of the corrugated shape of each of the pleats 15a, 16a and 17a is non-uniform in circumferential direction of the hose H. Therefore, in locations on the generating lines a, b and c where the pleats 15a, 16a and 17a don't exist, the hose H is little stretched axially. On the other hand, in locations opposite to the generating lines a, b and c where the unevenness of the corrugated shape is high, the hose H is stretched axially to the largest extent. As a result, the first to third bellows portions 15 to 17 of the hose H are bent through a predetermined angle with the generating lines a, b and c being on an inner side, whereby the hose H having a desired bent-shape is formed. When this hose H is removed out of the thermostatic chamber 26 and cooled down to ambient temperature lower than a plastic temperature, the shape of the hose H is stabilized in the predetermined bent-shape.

It should be noted that if the hose H is previously heated in a heating oven before it is placed into the thermostatic chamber 26, thereby previously rising the temperature of the water in the hose, the time of treatment of the hose in the thermostatic chamber 26 can be shortened.

The male coupler 25 is removed from the female coupler 24, whereby the hose H is completed. When the hose H is connected at its opposite ends to a radiator and an engine of an automobile, the operation for mounting the hose H can be finished simply by coupling the female couplers 24, 24 at the opposite ends of the hose H to male coupler 25, 25 previously mounted to the radiator and the engine.

The bending angles of the first to third bellows portions 15 to 17 of the hose H are determined automatically by the number of the pleats 15a, 16a and 17a. For example, the hose H of the present embodiment is bent through about 12° per one pleat 15a, 16a, 17a and hence, the bending angle of the first bellows portion 15 having the three pleats 15a is about 36°; the bending angle of the second bellows portion 16 having the five pleats 16a is about 60°; and the bending angle of the third bellows portion 17 having the two pleats 17a is about 24°.

In the first to third bellows portions 15 to 17 of the completed hose H, the pleats 15a, 16a and 17a have been almost stretched out and as a result, the bellows structure has been lost. Therefore, even if the hose H is exposed to a high temperature and a high pressure of cooling water when it is used as a radiator hose, the pleats 15a, 16a and 17a cannot be stretched and hence, the bending angles of the first to third bellows portions 15 to 17 cannot be varied over a long period of time. In the embodiment, even if a state at a temperature 120° C. and an internal pressure of $1.25 \times 10^5$ Pa is continued for 200 hours, the change in contour of the hose H is little observed. In addition, even if the hose H is stored in ambient temperature over a long period of time, the change in contour of the hose H is little observed.

By changing only the positions, shapes and numbers of the bellows-shaped pleats 15a, 16a and 17a which are previously formed in the hose H, any portions of the hose H can be bent through any angles in any directions. Moreover, only by heating he hose H in the thermostatic chamber 26, the pleats 15a, 16a and 17a are stretched automatically, whereby the hose H is bent. Therefore, special equipment is not required, leading to a reduction in cost.

A second embodiment of the present invention will now be described with reference to FIG. 7.

Figure 7:
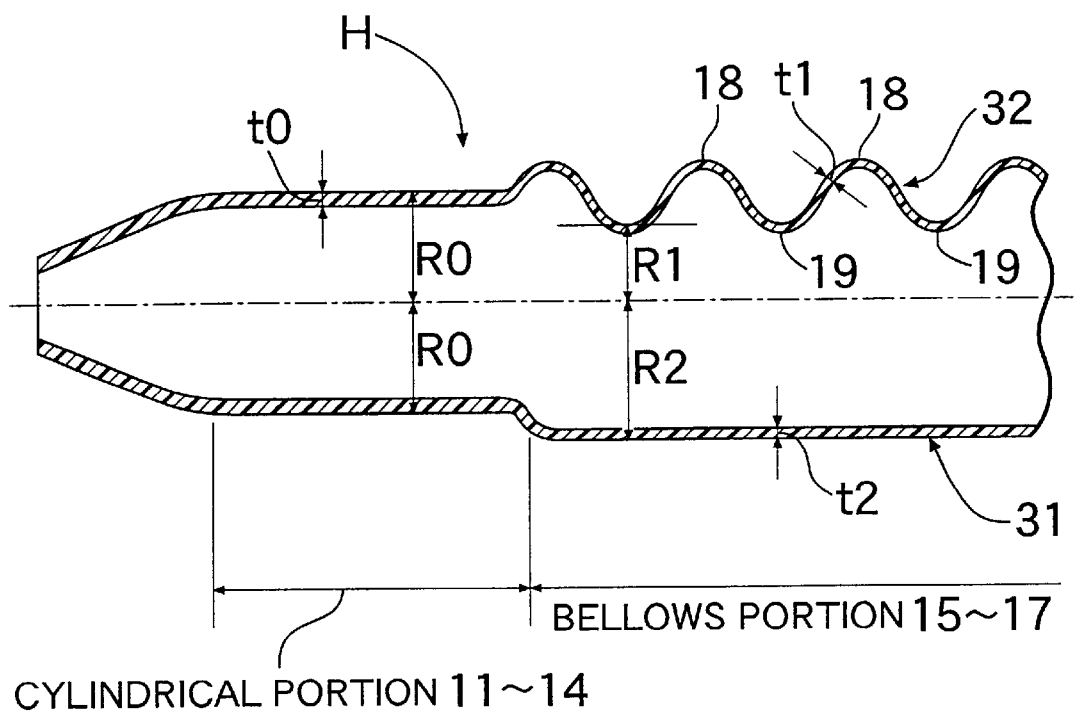

FIG. 7 shows a longitudinal sectional view of a hose H having first, second and third bellows portions 15, 16 and 17 formed by a corrugator 23. The outside diameter of cylindrical portions 11 to 14 having a lengthwise constant circular sectional shape is a given value R0, and the thickness of the cylindrical portions 11 to 14 is also a given value to. On the other hand, each of the first, second and third bellows portions 15, 16 and 17 includes a bellows wall 32 where crests 18 and valleys 19 are continuous, and a flat non-bellows wall 31. The outside diameters of the hose H about its center at the bellows wall 32 and the non-bellows wall 31 are different from each other. More specifically, the outside diameter R1 of the valley 19 of the bellows wall 32 is set smaller than the outside diameter R0 of the cylindrical portions 11 to 14 (R1<R0), and the outside diameter R2 of the non-bellows wall 31 is set larger than the outside diameter R0 of the cylindrical portions 11 to 14 (R2>R0).

In the first embodiment shown in FIG. 2, both of the outside diameter R1 of the valley 19 of the bellows wall 32 and the outside diameter R2 of the non-bellows wall 31 are equal to the outside diameter R0 of the cylindrical portions 11 to 14. In this case, the bellows wall 32 is stretched during formation of the first to third bellows portions 15 to 17 to have a decreased thickness thereof and on the other hand, the non-bellows wall 31 is not stretched with the thickness thereof being not decreased. Therefore, the thickness of the bellows wall 32 is smaller, and the non-bellows wall 31 is larger. When the first to third bellows portions 15 to 17 are non-uniform in thickness in the circumferential direction in the above manner, the strength of the bellows wall 32 having the smallest thickness is reduced and as a result, the durability of the entire hose H is reduced. If the thickness of the entire hose H is increased in order to prevent the above state, the following problems occur: the thickness of the non-bellows wall 31 becomes excessively large, resulting in an increased weight; and when the outside diameter of the hose H is uniform, the sectional area of a flow path is decreased.

In the second embodiment, however, the amount of bellows wall 32 stretched during the formation can be decreased, whereby the decrease in thickness of the bellows wall 32 can be suppressed to the minimum, because the outside diameter R1 of the valley 19 of the bellows wall 32 is set smaller than the outside diameter R0 of the cylindrical portions 11 to 14. In addition, the non-bellows wall 31 can be positively stretched during the formation, whereby the thickness t2 of the non-bellows wall 31 can be decreased, because the outside diameter R2 of the non-bellows wall 31 is set larger than the outside diameter R0 of the cylindrical portions 11 to 14. As a result, the difference between the thickness t1 of the bellows wall 32 and the thickness t2 of the non-bellows wall 31 after the formation can be decreased, whereby the durability of the entire hose H can be enhanced without increasing the thickness of the entire hose H that causes an increase in weight and a decrease in sectional area of the flow path.

When the hose H having a thickness t0 of 2.5 mm and made by extruding the polyamide 12 and TPO (thermoplastic olefin) into a cylindrical two-layer configuration is formed into the same shape as in the first embodiment in FIG. 2, the smallest thickness t1 of the bellows wall 32 is 1.0 mm, and the smallest thickness t2 of the non-bellows wall 31 is 2.5 mm and thus, the difference between the smallest thickness t1 and the smallest thickness t2 reaches 1.5 mm. On the other hand, when the hose H is formed into the same shape as in the second embodiment in FIG. 7, the smallest thickness t1 of the bellows wall 32 is increased to 1.5 mm, and the smallest thickness t2 of the non-bellows wall 31 is decreased to 2.0 mm and thus, the difference between the smallest thickness t1 and the smallest thickness t2 is also decreased to 0.5 mm.

A coolant liquid was encapsulated in an amount of 50% into each of the hose H in the first embodiment and the hose H in the second embodiment, and these hoses H were subjected to a durability test at a temperature of 130° C. and an internal pressure of 0.2 Mpa. The result showed that the hose H in the first embodiment was broken in 200 hours, and the hose H in the second embodiment was broken in 260 hours.

The shapes and the numbers of the bellows-shaped pleats 15a, 16a and 17a are not limited to those in the embodiments and may be changed properly. In short, if the height and the shape of the unevenness of the pleats 15a, 16a and 17a of the hose are varied in the circumferential direction, or the pleats 15a, 16a and 17a are formed at only a circumferential portion of the hose H, a difference can be generated in axially stretched amount among circumferential portions of the hose H to bend the hose H.

In the embodiments, the hose H containing water filled therein has been placed into the thermostatic chamber 26, where it has been heated and pressurized simultaneously by the high-temperature and high-pressure vapor generated from the water. Alternatively, for example, the heating of the hose H may be carried out by a heater or the like, and the pressurization of the hose H may be carried out by the supplying of compressed air or by another means. Therefore, third and fourth steps of the present invention may be carried out simultaneously or in sequence.

The hose H according to the present invention can be also utilized in any application other than a radiator hose for an automobile.

In the embodiments, the female couplers 24, 24 have been mounted at the opposite ends of the hose H, but these female couplers 24, 24 are not necessarily required.

The material for the hose H is not limited to TPO (thermoplastic olefin) and TPAE (thermoplastic polyamide), and any other thermoplastic resins can be used alone or in the form of a plurality of layers.

The outside diameter of the crest 18 of the bellows wall 32 has not been defined in the second embodiment, but its value is suitable to be as large as equal to the outside diameter R2 of the non-bellows wall 31. The difference (R0−R1) between the outside diameter R1 of the valley 19 of the bellows wall 32 and the outside diameter R0 of the cylindrical portions 11 to 14 is also suitable to be as large as equal to the difference (R2−R0) between the outside diameter R2 of the non-bellows wall 31 and the outside diameter R0 of the cylindrical portions 11 to 14.

Although the embodiments of the present invention have been described in detail, it will be understood that the present invention is not limited to the above-described embodiments, and various modifications in design may be made without departing from the spirit and scope of the invention defined in claims.

What is claimed is:

1. A process for producing a resinous hose formed from a thermoplastic resin having cylindrical portions extending rectilinearly and a bent bellows portion, said process comprising:

forming a cylindrical hose by extrusion;

forming a bellows portion which has pleats each shaped to be differentiated circumferentially, at least at a lengthwise portion of the extruded hose;

heating said hose having the bellows portion formed thereon into a plastic state;

bending said hose by applying a pressure to an inside of said hose heated into the plastic state, thereby stretching the pleats of said bellows portion; and cooling said bent hose.

2. A process for producing a resinous hose according to claim 1, wherein said bellows portion forming step includes forming a bellows wall having continuous crests and valleys, and forming a non-bellows wall located on the side diametrically opposite to said bellows wall, wherein a portion of said cylindrical hose is displaced radially inwards to form the valleys on the bellows wall, and a portion of said cylindrical hose is displaced radially outwards to form the non-bellows wall.

* * * * *